United States Patent
Rowe

(10) Patent No.: US 9,891,635 B1
(45) Date of Patent: Feb. 13, 2018

(54) DUAL-PISTON PRESSURE REDUCER

(71) Applicant: Carroll G. Rowe, Washington, AR (US)

(72) Inventor: Carroll G. Rowe, Washington, AR (US)

(*) Notice: Subject to any disclaimer, the term of this patent is extended or adjusted under 35 U.S.C. 154(b) by 19 days.

(21) Appl. No.: 15/206,037

(22) Filed: Jul. 8, 2016

Related U.S. Application Data

(60) Provisional application No. 62/190,630, filed on Jul. 9, 2015.

(51) Int. Cl.
*G05D 16/10* (2006.01)
*A62C 5/02* (2006.01)

(52) U.S. Cl.
CPC .......... *G05D 16/103* (2013.01); *A62C 5/02* (2013.01); *Y10T 137/7811* (2015.04)

(58) Field of Classification Search
CPC ... G05D 16/103; A62C 5/02; Y10T 137/7809; Y10T 137/781; Y10T 137/7811
USPC ........... 137/505.13, 505.26, 505.27, 505.28
See application file for complete search history.

(56) References Cited

U.S. PATENT DOCUMENTS

| | | | |
|---|---|---|---|
| 3,087,705 A * | 4/1963 | Hamilton | F16K 7/06 137/505.18 |
| 3,123,094 A | 3/1964 | Toschkoff | |
| 3,270,757 A | 9/1966 | Engler | |
| 3,392,749 A * | 7/1968 | Gneiding | G05D 16/0655 137/484.6 |
| 4,474,207 A * | 10/1984 | Rosenberg | G05D 16/10 137/220 |
| 5,899,221 A * | 5/1999 | Holt | G05D 16/10 137/116.5 |
| 6,257,275 B1 * | 7/2001 | Furbish | G05D 16/18 137/505 |
| 6,382,243 B2 * | 5/2002 | Hiddessen | G05D 16/10 137/505.18 |
| 2014/0360599 A1 * | 12/2014 | Kristoffersen | G05D 16/103 137/488 |

OTHER PUBLICATIONS

JP 2012216110 A; Suzuki et al.; Nov. 8, 2012; Original and Translation.*

* cited by examiner

*Primary Examiner* — William McCalister
*Assistant Examiner* — Paul J Gray

(57) ABSTRACT

A pressure-reducing flow regulator for use between a pressurized source and a pump inlet uses dual pistons to reduce the pressure at the pump inlet. Pressure reduction is achieved due to the ratio between the sum of the areas of the two pistons and the area of the inlet. When used in a compressed air foam system, this pressure reducer serves to increase the volume of air available at the desired pump pressure. In one embodiment, a flow of liquid is allowed through a central tube between the two pistons. In another embodiment, the central tube is sealed and a low-pressure bypass allows for flow between the outlet chamber and pressure chamber.

19 Claims, 2 Drawing Sheets

DUAL-PISTON PRESSURE REDUCER

CROSS-REFERENCE TO RELATED APPLICATIONS

This application claims the benefit of U.S. provisional patent application No. 62/190,630, entitled "Dual-Piston Pressure Reducer," filed on Jul. 9, 2015. Such application is incorporated herein by reference in its entirety.

BACKGROUND

Pressure regulators are used to automatically cut off the flow of a liquid or gas at certain pressures. These regulators are used for safety purposes in a variety of areas, including the aircraft industry, cooking, the oil and gas industry, and many others. In one particular application, they are a part of compressed air foam systems (CAFS) used for firefighting. In each application, the primary function of the regulator is to reduce an inlet pressure to a lower outlet pressure. Many of the existing pressure regulators use a spring-loaded poppet valve as the pressure reducing or restrictive element, and a diaphragm to sense the pressure changes. A spring is typically used to exert a force on the sensing element and to open the valve.

BRIEF SUMMARY

The present invention is directed to a pressure reducing flow regulator for use between a pressurized source and a pump inlet. The flow regulator uses dual pistons to reduce the pressure at the pump inlet, which, for example, may be desired in order to achieve an increased engine RPM for a desired pump discharge pressure. When used in a compressed air foam system, this would increase the volume of air available at the desired pump pressure. This invention could also be advantageous in foam concentrate proportioning systems using what is commonly called "around the pump" systems, where a portion of the discharge pump is routed through a venturi back into the suction side of the pump. In this use, the venturi is used to introduce foam concentrate into the stream of water being pumped. For the venturi to be effective in producing the volume of foam concentrate required, a specified differential of pressure between the inlet and pressure side of the pump is necessary.

These and other features, objects and advantages of the present invention will become better understood from a consideration of the following detailed description of the preferred embodiments and appended claims in conjunction with the drawings as described following:

DETAILED DESCRIPTION

Figure 1:
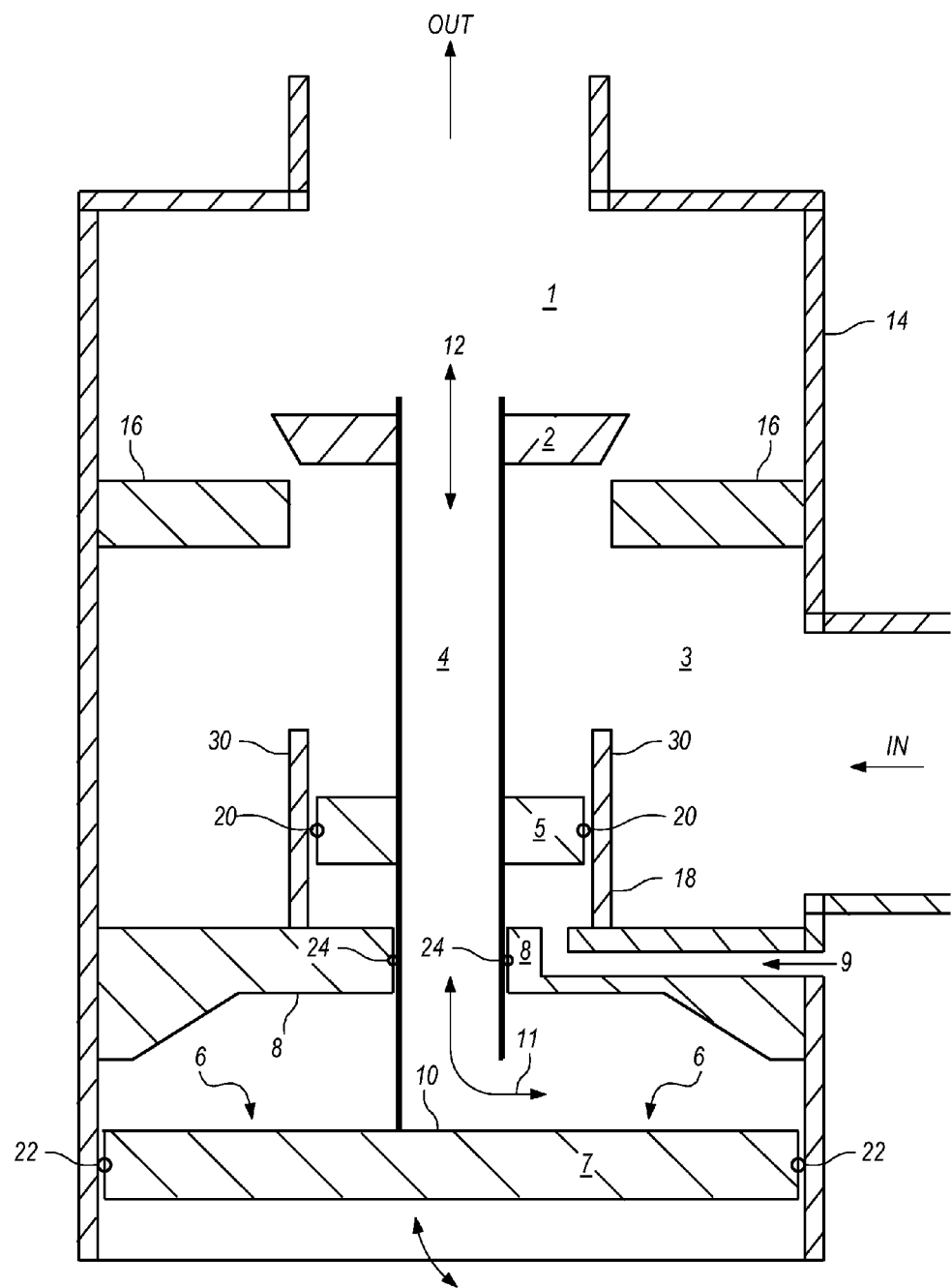
FIG. 1 shows one embodiment of the invention.

In one aspect the present invention is directed toward a dual-piston pressure reducing flow regulator as shown in FIG. 1. As pressurized water enters the pressure regulator at inlet 3, the water exerts pressure at valve 2, which sits at upper bulkhead 16, and at a moveable primary piston 5. The pressure exerted to open valve 2 is determined by the net difference of the surface area of the inlet valve 2 adjacent to the inlet 3 and the net surface area of the primary piston 5 adjacent to the inlet 3.

Moveable primary piston 5 is connected to inlet valve 2 and a moveable secondary piston 7 via a tube 4 so that the inlet control valve 2, primary piston 5, and secondary piston 7 all move as one assembly. The sum of the areas of the primary piston 5 and a moveable secondary piston 7 is larger than the sum of the area of the inlet control valve 2. The ratio of reduction of the inlet 3 pressure to the outlet chamber 1 pressure is determined by the relation of the area of the secondary piston 7 to the difference in the sum of the area of the primary piston 5 and the area of the inlet control valve 2. The primary piston cylinder has one or more vents 9 (one shown in FIG. 1) to the atmosphere on the side of the primary piston 5 opposite the side of the inlet chamber 3. This allows for free movement of secondary piston 7. The secondary piston 7 is vented to the atmosphere on its non-pressurized side. Secondary piston O-ring 22 seals secondary piston 7 with respect to the housing.

A lower bulkhead 8 separates the cylinder containing the primary piston 5 and the cylinder containing the secondary piston 7 within the housing. A circular opening in lower bulkhead 8 allows tube 4 connecting primary piston 5 and secondary piston 7 to extend through lower bulkhead 8. An O-ring 24 or other means of sealing known in the industry serves as a seal between lower bulkhead 8 and piston connecting tube 4, while piston O-ring 20 seals the gap between primary piston 5 and cylindrical wall 30, which extends upwardly from lower bulkhead 8 and circumscribes connecting tube 4. The end of tube 4 connected to secondary piston 7 is plugged with plug 10 to prevent flow to the vented side of secondary piston 7. Instead, a cross-drilled hole 11 in the tube allows flow into a pressure chamber 6 created by lower bulkhead 8 and secondary piston 7. Tube 4 extends through the inlet control valve 2 and terminates in an open end in outlet chamber 1.

Figure 2:
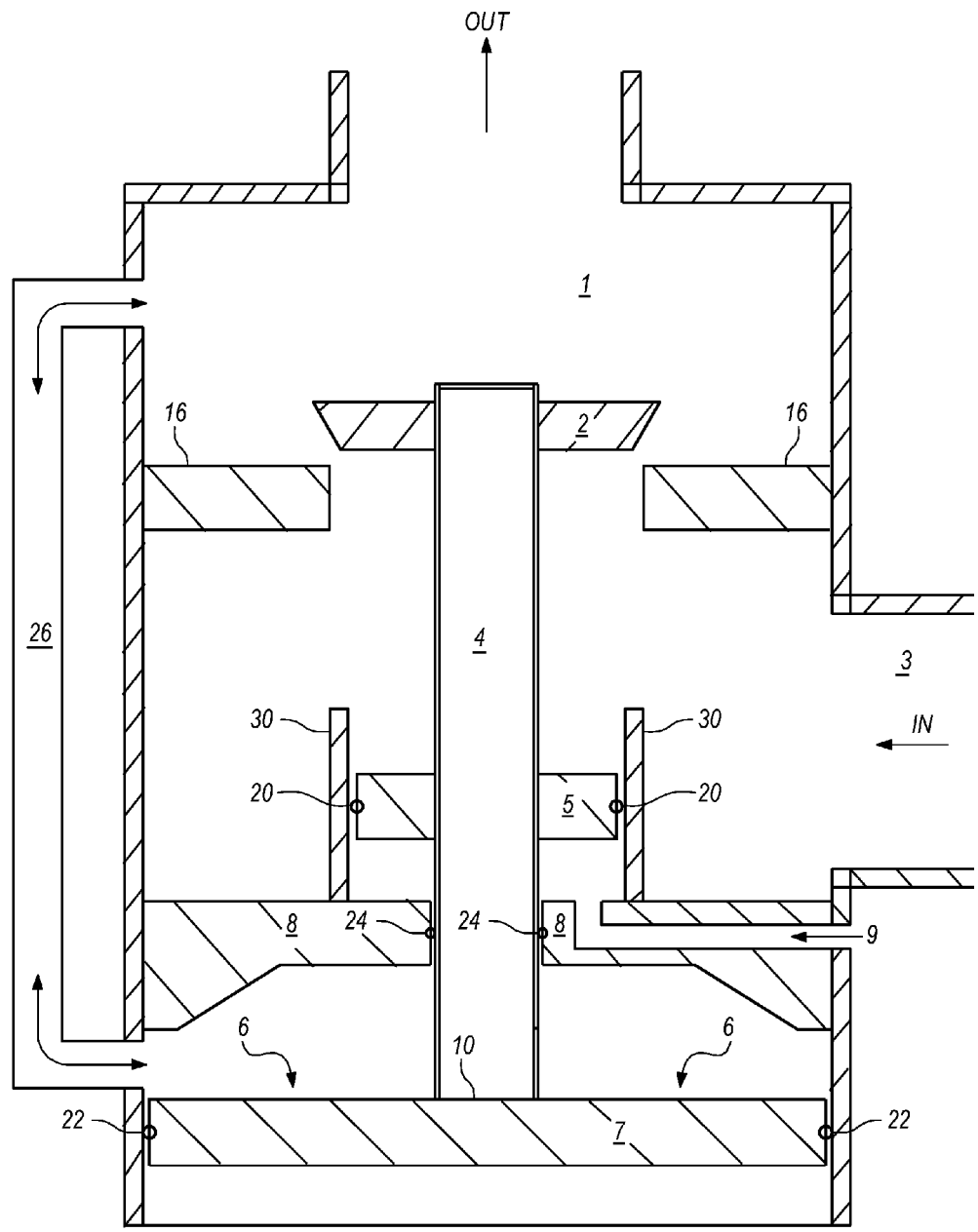
FIG. 2 shows an alternate embodiment of the invention, which comprises a low-pressure bypass.

As inlet valve 2 is opened by the pressurized water or other liquid, the water enters the low pressure discharge outlet chamber 1 of the pressure regulator. As the pressure rises in the discharge outlet chamber 1, the water is forced into the open area of connecting tube 4 and water moves through the tube 4 to the exit hole 11 into the pressure chamber 6. In an alternative embodiment as shown in FIG. 2, tube 4 could be sealed such that no flow is allowed through it; instead, a low pressure bypass 26 allows flow between outlet chamber 1 and pressure chamber 6. As inlet valve 2 is opened, water enters low pressure discharge outlet chamber 1. As the pressure rises in outlet chamber 1, the water is forced through low pressure bypass 26 into pressure chamber 6.

Because the area of the secondary piston 7 is greater than the sum of the differential of area of the inlet valve 2 and primary piston 5, the water flow into the pressure chamber 6 causes a sum of forces on primary piston 5 and secondary piston 7 to overcome the force exerted at inlet valve 2, thus closing inlet valve 2. As pressure drops in pressure chamber 6, the force exerted by secondary piston 7 is lessened, allowing inlet valve 2 to open.

Alternatively, there are times that it may be desirable to have a negative pressure at the pump inlets, such as, for example, when there is a need to simulate drafting from a source that is below the level of the pump inlet. In one embodiment, the present invention is also directed at achieving this goal. In this embodiment, the area of primary piston 5 is equal to or slightly larger than the area of inlet valve 2. The variation of pressure (or negative pressure) in outlet chamber 1 will still determine inlet valve 2 position according to pump demands. Furthermore, inlet valve 2 may be designed so that it is configured in a tapered design (for example, a cone) where the taper extends into inlet chamber 3 through the valve seat throughout the range of movement of inlet valve 2. The differential in area projecting into and exposed to the incoming pressure from the pressurized source would cause an increase in negative pressure at outlet chamber 1 to maintain an increased flow.

Another alternative embodiment has a spring (not shown) that progressively increases resistance to the opening of inlet valve 2, thus affecting negative pressure required for further increase flow through inlet valve 2. The progressive negative pressure with increased flow is capable of mimicking a venturi effect for the introduction of, for example, a foam concentrate into low-pressure outlet chamber 1 before it enters the pump. A compressed air foam system (CAFS) may take advantage of this effect to introduce a surfactant to water or other liquid. A venture (around the pump system) is dependent on a velocity change due to pressure differential, and by reducing the pump inlet pressure, the venturi creates a velocity changing pressure differential. This type of system typically limits the discharge pressure and flow to a specific range relative to inlet pressure and limits discharge hose length and pressure drop. The introduction of the foam concentrate into the suction area eliminates these problems.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A pressure reducing flow regulator comprising:
   a. a housing;
   b. an upper bulkhead attached to said housing;
   c. a lower bulkhead attached to said housing, wherein said lower bulkhead comprises a vent;
   d. a connecting tube having a first end, a second end, and a middle, wherein said first end of said connecting tube extends through said upper bulkhead and said second end of said connecting tube extends through said lower bulkhead;
   e. a primary piston attached at said middle of said connecting tube, wherein said primary piston has a primary piston area;
   f. a secondary piston attached at said second end of said connecting tube, wherein said secondary piston has a secondary piston area;
   g. an inlet chamber adapted to receive a liquid at an inlet pressure;
   h. an outlet chamber adapted to receive the liquid at an outlet chamber pressure;
   i. an inlet valve attached at said first end of said connecting tube, wherein said inlet valve controls flow of the liquid from said inlet chamber to said outlet chamber, thereby increasing said outlet chamber pressure, further wherein said inlet valve has an inlet valve area, further wherein said inlet valve has an open position and a closed position, and further wherein said liquid exerts an inlet valve force on said inlet valve and an inlet piston force on said primary piston; and
   j. a pressure chamber, wherein said pressure chamber is formed by said secondary piston, said connecting tube, said housing and said lower bulkhead, further wherein said liquid flows into and out of said pressure chamber thereby changing a secondary force exerted on said secondary piston.

2. The pressure regulator of claim 1, wherein said inlet pressure is at least equal to said opening pressure, wherein said opening pressure acts on said inlet valve area and primary piston area, thereby moving said inlet valve into said open position, thereby allowing said liquid to enter said outlet chamber.

3. The pressure regulator of claim 1, wherein said inlet pressure is less than said opening pressure, thereby leaving said inlet valve in said closed position, thereby prohibiting said liquid from entering said outlet chamber.

4. The pressure regulator of claim 1, wherein the sum of said primary piston area and said secondary piston area is greater than said inlet valve area.

5. The pressure regulator of claim 1, wherein a ratio of reduction of said inlet pressure to said outlet pressure is determined by the relation of said secondary piston area to the sum of said primary piston area and said inlet valve area.

6. The pressure regulator of claim 1, wherein said primary piston area is less than said inlet valve area.

7. The pressure regulator of claim 1, wherein said primary piston area is at least equal to said inlet valve area.

8. The pressure regulator of claim 1 further comprising a primary piston O-ring, wherein said primary piston O-ring seals said primary piston against a cylindrical wall.

9. The pressure regulator of claim 1 further comprising a secondary piston O-ring, wherein said secondary piston O-ring seals said secondary piston against said housing.

10. The pressure regulator of claim 1 further comprising a connecting tube O-ring, wherein said connecting tube O-ring seals said connecting tube against said lower bulkhead.

11. The pressure regulator of claim 1, wherein said first end of said connecting tube is closed, thereby prohibiting flow of said liquid into said connecting tube.

12. The pressure regulator of claim 1, wherein said first end of said connecting tube comprises an upper tube aperture, thereby allowing flow of said liquid into said connecting tube.

13. The pressure regulator of claim 12, wherein said second end of said connecting tube comprises a lower tube aperture, wherein said lower tube aperture allows flow of said liquid between said second end of said connecting tube and said pressure chamber.

14. The pressure regulator of claim 13, wherein said outlet chamber force increases thereby forcing flow of said liquid from said outlet chamber through said connecting tube into said pressure chamber, thereby increasing said secondary force exerted on said secondary piston.

15. The pressure regulator of claim 14, wherein the sum of said secondary force and said inlet piston force is greater than said inlet valve force, thereby moving said inlet valve into said closed position.

16. The pressure regulator of claim 15, wherein said liquid exits said outlet chamber through an outlet aperture thereby decreasing said outlet chamber pressure, thereby decreasing said secondary force exerted on said secondary piston, thereby moving said inlet valve into said open position.

17. The pressure regulator of claim 11 further comprising a low pressure bypass, wherein said low pressure bypass connects said outlet chamber and said pressure chamber, thereby allowing flow of said liquid between said outlet chamber and said pressure chamber.

18. The pressure regulator of claim 17, wherein the sum of said secondary force and said inlet piston force is greater than said inlet valve force, thereby moving said inlet valve into said closed position.

19. The pressure regulator of claim 18, wherein said liquid exits said outlet chamber through an outlet aperture thereby decreasing said outlet chamber pressure, thereby decreasing said secondary force exerted on said secondary piston, thereby moving said inlet valve into said open position.

* * * * *